United States Patent Office 3,661,872
Patented May 9, 1972

---

3,661,872
SHORTSTOP AND STRIPPING AIDS
James N. Short, Bartlesville, Okla., and Antonio A. Geraldo, Borger, Tex., assignors to Phillips Petroleum Company
No Drawing. Filed Apr. 13, 1970, Ser. No. 28,073
Int. Cl. C08d 5/02, 3/04, 3/08
U.S. Cl. 260—85.1
8 Claims

ABSTRACT OF THE DISCLOSURE

A combination polymerization shortstop and stripping process for solution polymerization systems comprising the use of sugar ester surfactants which are either oil- or water-soluble.

---

This invention relates to a method of shortstopping a solution polymerization system. In another aspect this invention relates to the method of stripping the resulting polymer solution obtained from the polymerization system. In yet another aspect, this invention relates to a combination process of shortstopping and stripping a solution polymerization system.

Industry has, in recent years, developed a variety of new types of polymeric materials, especially rubbery materials, wherein the polymer is produced in the presence of organometal initiators. The products of such polymerization processes are recovered from the polymerization zone as a solution in a hydrocarbon solvent. Steam stripping of the polymerization zone effluent has developed as the commercially advantageous polymer recovery method, but certain operation difficulties have arisen. Difficulties from additives required for satisfactory shortstopping, steam stripping, and from crumb formation methods continued to plague the industry. For satisfactory polymerization, termination control, and polymer recovery from the solution polymerization systems, fewer additives with controllable side effects are desirable.

It is an object of this invention to provide a combination short-stopping-stripping process for solution polymerization systems.

It is another object of this invention to provide a process for assisting the recovery of rubber crumb from a polymer solution by steam stripping.

We have discovered a combination shortstopping-stripping method for solution polymerization systems, preferably those employing organo lithium initiators, by employing fatty acid sugar esters as shortstopping-stripping agents. The fatty acid sugar ester compounds used by the method of our invention are nonionic surfactants. Mixtures of the apropriate sugar ester compounds which are either oil- or water-soluble can be employed, therefore providing a functional reactant in the solution polymerization system effluent and in the water phase stripping process.

Although present steam stripping processes have worked for the past several years, drawbacks have been apparent and there is a need for an improved method. The use of anionic additives in the stripping water, for example, sodium salts of polymeric carboxylic acids, provided by the Rohm & Haas Company under the name of Tamol 731, can lead to excessive foaming and overflow, becoming a possible solvent poison if not properly removed. The use of calcium chloride, for example, or hard water leads to calcium scale formation in crumb slurry transfer lines, holding tanks, and drying equipment. Calcium also appears in the finished polymer and its presence may have a detrimental effect in the end use of such polymers.

The use of fatty acids as shortstop for solution polymerization systems has presented handling problems, for example, molten fatty acid requires properly insulated equipment, otherwise plug-ups of solidified acid occur. Long storage of the molten fatty acids also tends to produce discoloration of the acid and occasionally has resulted in off-color polymer. The method of this invention has provided a suitable replacement for the fatty acid shortstop and for the calcium chloride-Tamol stripping aids through the use of nonionic surfactants which act as shortstop, stripping, and crumbing aids.

The combination shortstopping-stripping agents employed by the method of our invention are sugar esters, especially derivatives of sorbitan compounds. These agents are fatty acid esters of: (A) sorbitan-sorbide mixtures and (B) the polyethyleneoxy derivatives of said sorbitan-sorbide mixtures. The compounds of group (A) which are used can be represented by the following formulae:

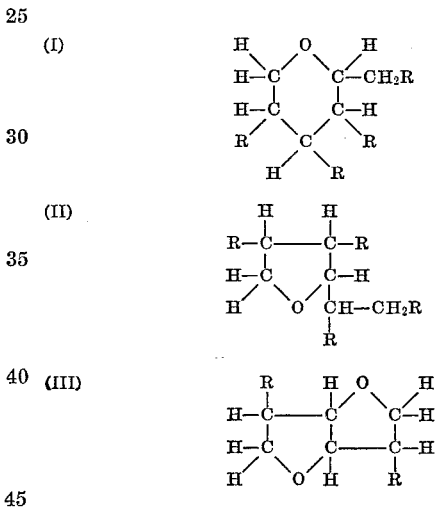

where R is selected from the group consisting of OH and

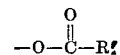

at least one of said R's being an OH radical, and R' is a residue of a fatty acid, preferably a residue of a long chain fatty acid, saturated or unsaturated, containing from 5 to 25 carbon atoms. Examples of suitable fatty acid esters of sorbitans and sorbides include sorbitan monocaproate, sorbitan monocaprylate, sorbitan monocaprate, sorbitan tricaprate, sorbitan monolaurate, sorbitan trilaurate, sorbide monolaurate, sorbitan monomyristate, sorbitan tripalmitate, sorbitan monostearate, sorbide monostearate, sorbitan monolignocerate, sorbitan monopalmitoleate, sorbitan monooleate, sorbitan trioleate, sorbide monooleate, sorbitan monogadoleate, sorbitan monoactoleate, sorbide monocerotate, and the like.

Compounds of group (B) used in this invention can be represented by the following formulae:

(IV) 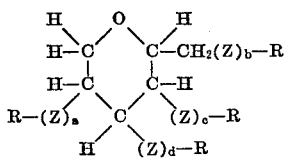

(V) 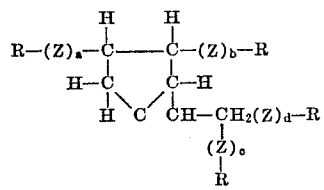

(VI) 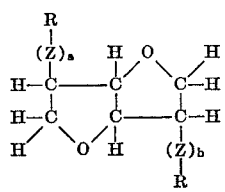

where R has the same meaning as before and at least one of the R's being an OH radical and wherein Z is an ethylenoxy group (—O—CH$_2$CH$_2$—) and wherein $a$, $b$, $c$, and $d$ are zero or integers from 1–20 and wherein the sum of $a$, $b$, $cc$, and $d$ is in the range of from about 4 to about 20.

Said agents encompass compounds which are oil soluble and those which are water soluble or dispersible. It is preferred that the oil-soluble agents be employed as the copolymerization shortstops while the water-soluble agents be employed as parting aids in the stripping operation. Mixtures of the above agents can be employed in the shortstopping and stripping steps. It is often convenient to add a mixture of a compound from group (A) and one from group (B) in the shortstopping step thus avoiding the necessity of adding the compound from group (B) at a later step prior to stripping.

Examples of agents which can be used are commercially available surfactants produced by Atlas Chemical Company under the trade names of Span and Tween. Spans are generally oil soluble and accordingly more suited as shortstop agents while Tweens are generally water soluble and more suited for stripping in crumb formation. Sorbitan monesters, such as Span 80, Span 60, Span 20, contain more than one OH group and are accordingly preferred to more highly esterified materials as shortstops. However, more highly esterified sugar esters can be used provided not all OH groups are blocked. The Tweens are water soluble and are used in conjunction with Spans to assist in recovering rubber crumb from the polymer solution by steam stripping. It is preferred that a small amount of cationic surfactant, e.g., a quaternary ammonium chloride, also be added to the shortstopped polymerization zone effluent prior to stripping or for the stripping or to the water employed for the stripped operation. Said cationic surfactants have been employed in the prior art as synthetic or natural rubber latex stabilizers and appear to assist in rubber crumb formation and separation in the instant invention. If added, the amount of said cationic surfactant employed is in the range of from 0.01 to 0.50, preferably 0.05 to 0.10 part by weight per 100 parts by weight of rubber (phr.). The shortstopping-stripping method of this invention is especially well suited, as discussed, to those solution polymerization systems which employ lithium-based initiators. It is known that such systems are exceedingly versatile in that rubbery homopolymers of conjugated dienes, copolymers of conjugated dienes, and vinyl aromatic compounds can be produced. However, the shortstopping-stripping method of this invention can also be profitably employed with any other solution polymerization system which can employ active hydrogen compounds as shortstops and from which the polymer can be recovered by steam stripping. For example, coordination type catalysts based on titanium compounds, or cobalt compounds, or nickel compounds for polymerization of butadiene or isoprene to high cis-polymers are also generally employed in solution polymerization systems. Such polymerizations also can be shortstopped and stripped according to the method of this invention.

The method of this invention can also be employed for the recovery of polymers prepared in solution with lithium-based initiators which have been terminated with compounds to introduce linearly branching by coupling three or more polymer molecules, e.g., stannic chloride. In such cases the compounds of group (A) or (B) do not function as a shortstop but do serve to promote the crumb formation and separation in the stripping step. The method of this invention is also applicable to the recovery from solution, in crumb form, of rubbery polymer mixtures with extender oils (oilexes). For example, an extender oil may be blended with a solution of rubbery polymer wherein this mixture then is treated with the agents of the invention and stripped to recover the rubber crumb containing the extender oil.

The amount of nonionic surfactant employed from groups (A) and (B) above is from 0.01 to 1.00, preferably 0.15 to 0.30, phr., while the total amount employed of compounds from groups (A) and (B) is from 0.02 to 2.00, preferably 0.30 to 0.60 phr.

In addition to the problems of the prior art which are avoided by the use of the shortstopping-stripping agents of this invention, it was found that the modulus of a vulcanized polybutadiene and a butadiene-styrene random copolymer recovered through the method of this invention was raised by 150 p.s.i. compared to the same polymer recovered by the prior art procedure employing Tamol-calcium chloride. This improved result is demonstrated in one of the following examples.

In the examples given below the stripping process was carried out employing a 250 gallon stripper in a continuous process. Cyclohexane solution of polymer, containing about 10 weight percent polymer, was fed to the stripper which contained about 150 gallons of water at the rate of 1 to 2 gallons per minute. Stripper contents were maintained at 200–210° F. and were also agitated. Rubber crumb formation and separation was observed by means of sight glass on the stripper vessel. Rubber crumb was removed for examination, from the stripper by intermittent discharge of a portion of the stripper content through a ball valve controlled on a timed cycle.

EXAMPLE I 1,3-butadiene was polymerized in cyclohexane with a lithium-based catalyst. The polymerization mixture was treated with stannic chloride to provide a branched rubbery polymer having a Mooney viscosity of 46 ML–4 at 212° F. (ASTM D 1646–63). A sorbitan monooleate (Span 80), 0.25 phr., and a monooleate ester of a polyoxyethylene derivative of sorbitan having about 20 oxyethylene groups per molecule (Tween 80), 0.25 phr., were added to the cyclohexane solution of the above polybutadiene and the resultant mixture stripped under the conditions described above. Stripping was trouble-free and small rubber crumbs were continuously discharged from the stripper.

EXAMPLE II

Another polybutadiene was prepared as described in Example I and treated with stannic chloride to provide a branched rubbery polymer having a Mooney viscosity of 52 ML–4 at 212° F. The cyclohexane solution of this polybutadiene was stirred with 0.20 phr. sorbitan monooleate (Span 80) and 0.20 phr. polyoxyethylene sorbitan monooleate (Tween 80). The resulting mixture was then fed continuously to the stripper which in this run had 0.05 phr. of a cationic surfactant, a mixture of methyldodecylbenzyltrimethylammonium chloride and methyldodecylxylylene-bis-trimethylammonium chloride (Hyamine 2389) added continuously to the stripper water. This cationic surfactant was added in the fresh-make-up water at a rate sufficient to provide 0.05 phr. of the reagent in the stripper vessel.

In this run stripper operation was trouble-free and small rubber crumbs were obtained continuously during the run.

EXAMPLE III

Another polybutadiene was prepared in cyclohexane solution employing a lithium-based catalyst. The polymerization mixture was shortstopped with a mixture of sorbitan monooleate (Span 80) (0.15 phr.) and polyoxyethylene sorbitan monooleate (Tween 80) (0.15 phr.). This polybutadiene had a Mooney viscosity of 52 ML-4 at 212° F. The shortstopped polymer solution was stripped under the general conditions described earlier and with 0.05 phr. of a cationic surfactant.

The stripping operation in this run was again without difficulty and continuous discharge of rubber crumb was achieved. The crumb size in this run appeared to be larger than that obtained in Example II above.

EXAMPLE IV

Another polybutadiene was prepared in cyclohexane solution with a lithium-based initiator and was then treated with stannic chloride as in Examples I and II. The terminated branched polybutadiene had a Mooney viscosity of 48 ML-4 at 212° F. The cyclohexane solution of this polymer was then mixed with 0.5 phr. of sorbitan monooleate (Span 80) and the resulting mixture fed to the stripper under the conditions described earlier. In this run an aqueous dispersion of about 0.01 weight percent of polyoxyethylene sorbitan monooleate (Tween 80) was fed continuously to the stripper with the rate of addition being such that 0.1 phr. of this reagent was present in the stripper during the stripping operation.

Crumb formation and separation was good throughout the run and crumb was discharged continuously from the stripper with no problems.

EXAMPLE V

Two additional polybutadienes were made in cyclohexane solution with lithium-based initiators and then treated with stannic chloride. These polymers were prepared under essentially the same conditions. One polymer solution was then treated according to this invention in order to recover the polymer (Run 1) while the other solution was treated with the combination of the sodium salt of a copolymer of diisobutylene and maleic anhydride (Taml 731) and $CaCl_2$ in the stripper water during the stripping step (Run 2), a process of the prior art.

In Run 1, 0.15 phr. each of sorbitan monooleate (Span 80) and polyoxyethylene sorbitan monooleate (Tween 80) were added to the shortstopped polymer solution and the solution then fed continuously to the stripper. An aqueous solution of the cationic surfactant (Hyamine 2389) employed in Example II was also added continuously so that 0.05 phr. of this reagent was present in the stripper during the run.

Stripper operation in both Run 1 and Run 2 was without difficulty and continuous discharge of rubber crumb was achieved in both runs.

The rubbery products from both runs were compounded in the recipe shown below and the physical properties determined on the vulcanizates. These properties are presented in Table I below.

Compounding Recipe

| | Parts by weight |
|---|---|
| Rubber | 100 |
| IRB #2 [a] | 50 |
| Zinc oxide | 3 |
| Dutrex 726 [b] | 10 |
| Stearic acid | 2 |
| Sulfur | 1.75 |
| Santocure NS [c] | 0.8 |

[a] Industry Reference Black No. 2, a high abrasion furnace carbon black.
[b] Aromatic processing oil, ASTM D 2226-63T, Type 102.
[c] N-tert-butyl-2-benzothiazolesulfenamide.

TABLE I.—PHYSICAL PROPERTIES

| | Polymer of— | |
|---|---|---|
| | Run 1 | Run 2 |
| Compounded Mooney, ML-4 at 212° F | 77 | 73 |
| | Stocks cured 35 minutes at 293° F. | |
| Tensile, p.s.i. [a] | 2,370 | 2,490 |
| Elongation, percent [b] | 430 | 470 |
| 300% modulus, p.s.i. [a] | 1,270 | 1,070 |
| Shore A Hardness [b] | 61 | 60 |
| Heat Build-up (ΔT), °F. [c] | 52 | 57 |
| Resilience, percent [d] | 76 | 75 |

[a] ASTM D 412-66.
[b] ASTM D 1706-61.
[c] ASTM D 623-62.
[d] ASTM D 945-59.

The results in Table I demonstrate that the polybutadiene recovered according to this invention showed a higher 300% modulus as well as lower heat build-up than the polymer recovered by a prior art method.

EXAMPLE VI

A butadiene/styrene (75/25) random copolymer was prepared in cyclohexane solution with a lithium-based initiator and the polymer treated with stannic chloride. This single reactor batch was then divided and one portion treated to recover the polymer according to this invention (Run 1) and the other portion treated according to the prior art method of Example V (Run 2).

In Run 1 of the instant example 0.20 phr. each of sorbitan monooleate (Span 80) and polyoxyethylene sorbitan monooleate (Tween 80) was mixed with one portion of the above reactor batch and the mixture fed to the stripper while also feeding an aqueous solution of the cationic surfactant employed in Run 1 of Example V at a rate such that 0.1 phr. of this reagent was present in the stripping zone.

Stripper operation was again trouble-free in both runs and continuous discharge of rubber crumb was achieved in both cases.

The products from these runs were compounded in the recipe shown below and the physical properties of the vulcanizates measured.

Compounding recipe

| | Parts by weight |
|---|---|
| Rubber | 100 |
| IRB #2 | 40 |
| Zinc oxide | 5 |
| Stearic acid | 2 |
| Sulfur | 2 |
| Altax [a] | 1.5 |

[a] 2,2'-dibenzothiazyl disulfide.

The properties of the vulcanizates are shown in Table II below.

TABLE II.—PHYSICAL PROPERTIES

| | Polymer of— | |
|---|---|---|
| | Run 1 | Run 2 |
| Compounded Mooney, ML-4 at 212° F. | 54 | 52 |
| | Stocks cured 50 minutes at 293° F. | |
| Tensile, p.s.i. | 3,590 | 3,500 |
| Elongation, percent | 670 | 700 |
| 300% modulus, p.s.i. | 980 | 875 |
| Shore A Hardness | 60 | 60 |
| Heat build-up, (ΔT), ° F | 88.0 | 88.2 |
| Resilience, percent | 70.2 | 69.8 |

The results of Table II again demonstrate that a rubbery polymer with higher modulus is obtained when employing this invention in comparison with the polymer recovered by a prior art method.

The foregoing examples are results demonstrate that the method of this invention satisfactorily provides a combination solution polymerization shortstop and stripping process. The fatty acid sugar esters and combinations thereof used in the aforementioned process also aid in crumb formation where improved polymer physical properties were observed.

As will be evident to those skilled in the art, many variations and modifications can be practiced in view of the foregoing disclosure. Such variations and modifications are believed to come within the spirit and scope of the invention.

What we claim is:

1. In the process of shortstopping a polymerization solution, the improvement comprising contacting said solution with at least one agent selected from the group consisting of
   (a) fatty acid sugar ester derivatives of sorbitan-sorbide mixtures;
   (b) polyethyleneoxy derivatives of sorbitan-sorbide mixtures, and
   (c) a mixture of (a) and (b).

2. A process according to claim 1 wherein
   (a) the fatty acid sugar ester derivatives of sorbitan-sorbide mixtures are comprised of compounds having the formulae:

(I) 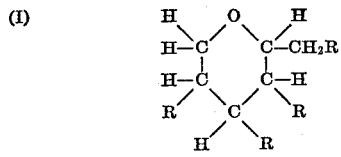

(II) 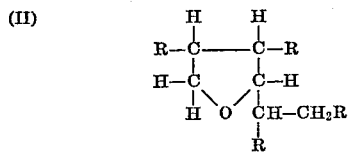

(III) 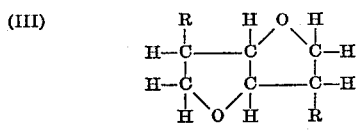

where R is selected from the group consisting of OH and

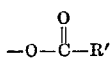

at least one of said R's being and OH radical, and R' is a residue of a fatty acid, preferably a residue of a long chain fatty acid, saturated or unsaturated, containing from 5 to 25 carbon atoms;

(b) the polyethyleneoxy derivatives of sorbitan-sorbide mixtures are comprised of compounds having the formulae:

(IV) 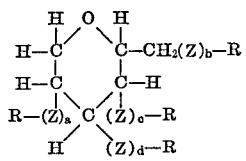

(V) 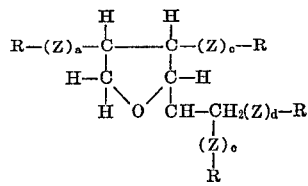

(VI) 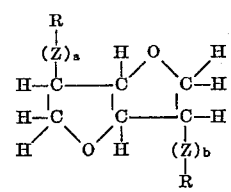

where R has the same meaning as before and at least one of the R's being an OH radical, and wherein Z is an ethyleneoxy group ($-O-CH_2CH_2-$) and wherein $a$, $b$, $c$ and $d$ are zero or integers of from 1–20 and wherein the sum of $a$, $b$, $c$ and $d$ is in the range of from about 4 to about 20; and (c) a mixture of (a) and (b).

3. A process according to claim 1 wherein the resulting shortstopped polymerization solution is steam stripped in the presence of a mixture of fatty acid sugar ester derivatives of sorbitan-sorbide mixtures and polyethyleneoxy derivatives of sorbitan-sorbide mixtures, and thereafter recovering a rubbery polymer.

4. A process according to claim 3 wherein the amount of fatty acid sugar ester, sorbitan-sorbide derivative and the amount of the polyethyleneoxy sorbitan-sorbide derivative is from 0.01 to 1.00 part by weight per 100 parts by weight of rubber, respectively.

5. A process according to claim 3 wherein the ratio of the fatty acid sugar ester sorbitan sorbide derivative to the polyethyleneoxy sorbitan-sorbide derivative is 1:1.

6. A process according to claim 1 wherein the fatty acid sugar ester sorbitan-sorbide derivative is sorbitan monooleate and the polyethyleneoxy sorbitan-sorbide derivative is polyethyleneoxy sorbitan monooleate.

7. A process according to claim 3 wherein the steam stripping process is carried out in the presence of a cationic surfactant such as a quaternary ammonium chloride.

8. A process according to claim 7 wherein the cationic surfactant constitutes from 0.01 to 0.50 part by weight per 100 parts by weight of rubber.

References Cited

UNITED STATES PATENTS 3,190,868  6/1965  Mitachek et al. ____ 260—94.7

FOREIGN PATENTS 668,693  8/1963  Canada _____ 260—94.7

JOSEPH L. SCHOFER, Primary Examiner

W. F. HAMROCK, Assistant Examiner

U.S. Cl. X.R.

260—94.7 A, 96

UNITED STATES PATENT OFFICE

CERTIFICATE OF CORRECTION

Patent No. 3,661,872                                                Dated: May 9, 1972

James N. Short et al

It is certified that error appears in the above-identified patent and that said Letters Patent are hereby corrected as shown below:

Column 7, line 69, "and" should be -- an -- .

Column 8, Formula V, that portion of the formula reading $$R-(Z)_a-C---C-(Z)_c-R$$

should read $$R-(Z)_a-C---C-(Z)_b-R$$

Signed and sealed this 29th day of August 1972.

(SEAL)
Attest:

EDWARD M. FLETCHER, JR.
Attesting Officer

ROBERT GOTTSCHALK
Commissioner of Patents